March 22, 1932.  A. T. PURSELL  1,850,137

POWER ACTUATED SAW AND DRILL MECHANISM

Filed May 8, 1929

Inventor.

Arthur T. Pursell, by Thomas G. Steward,

Attorney.

Patented Mar. 22, 1932

1,850,137

UNITED STATES PATENT OFFICE

ARTHUR TOD PURSELL, OF LOS ANGELES, CALIFORNIA, ASSIGNOR TO WALTER C. SCOTT, OF CHICAGO, ILLINOIS

POWER-ACTUATED SAW AND DRILL MECHANISM

Application filed May 8, 1929. Serial No. 361,415.

The invention relates to power-actuated implements for use in sawing or drilling operations, and generally consists of means whereby either a saw or a drill may be actuated by one and the same motor. The invention further consists of novel details of construction which adapt the train of mechanism through which power is transmitted to the saw, to be coupled with the proximate element of the motor.

Figure 1:
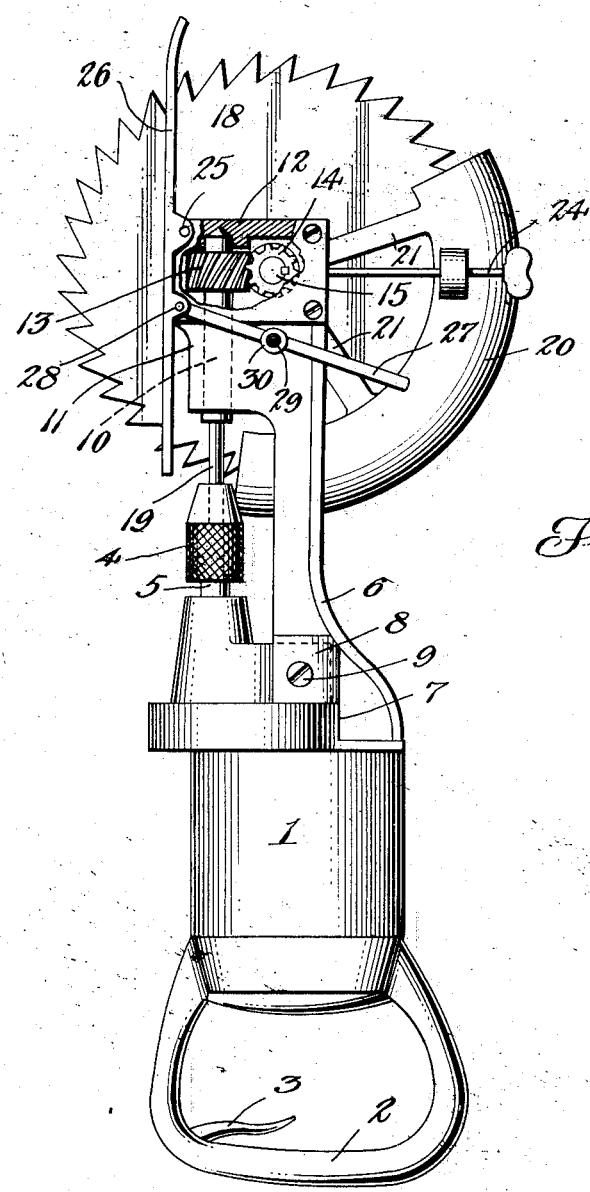
Figure 2:
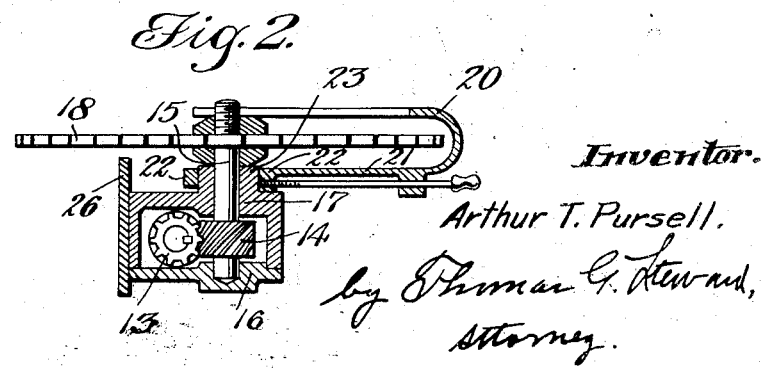

Figure 1 of the drawings, constituting a part of this specification, shows the salient features of the invention in vertical section, and Figure 2 shows a section of the device, parts of the mechanism being shown in elevation.

Referring to the drawings, 1 is an electrical motor of usual type, 2 is the handle of said motor and 3 is the trigger for the switch of the electrical circuit.

The chuck 4 of said motor 1 is of any known kind, its shaft 5 having the usual connection with the adjacent element of the motor.

The saw frame 6 is shouldered or stepped, as at 7, and the shouldered part fits only partly around the mating part of the electrical motor 1, as at 8, while the lower end abuts the body of the motor, a rigid union of the frame and the motor being effectuated by a screw means 9.

The saw frame 6 carries a driven longitudinally arranged shaft 10 that is mounted in aligned bearings 11 and 12, and on this shaft 10 is fixed a spiral gear 13 disposed between said bearings 11 and 12, another spiral gear 14 fixed on a transverse journal 15 engaging said spiral gear 13 and being driven thereby. The journal 15 is mounted in aligned bearings 16 and 17, and on it is mounted the circular saw 18.

The shaft 10 extends rearwardly at 19 to enable it to be inserted in the chuck 4 and to receive power therefrom, the size of said chuck being such that it will hold either the extended end 19 of said shaft 10, or a drill, whereby, when the sawing mechanism is not used, a drill may be employed.

An adjustable guard 20 is carried by arms 21 extending outward from a sleeve 22 mounted on the hub 23 of the frame 6, a long set screw 24 being used to clamp said sleeve 22 on the hub 23, to thereby hold said guard 20 in any desired position relative to the periphery of the saw.

Pivotally mounted at 25 on the saw frame 6, is a gauge 26 which may be adjusted to assume various angular positions relatively to said frame 6, an actuating handle 27 pivoted to said guage at 28 being employed to manipulate said gauge. This handle 27, and consequently the gauge, may be locked in any desired position by a set screw 29 carried by an oscillatory collar 30 that is mounted on said frame 6 and through which said handle 27 extends. When the saw is operating upon material lying parallel with and below the frame 6, the gauge 26 will be disposed parallel with the surface of said material, but when the material to be cut is disposed at a right angle to said frame, the gauge will be so adjusted that it also will be disposed at a right angle thereto, it being, of course, understood that said gauge 26 may be made to assume any intermediate position such as may be required. The position of the guard 20 will be determined by the position of the gauge 26 at any given time.

Having thus described my invention, what I claim is:

A saw and drill mechanism including in combination, a saw frame having saw-driving elements and a motor having a shaft carrying a chuck that is aligned with the initial element of said saw-driving elements, said saw frame being shouldered to fit the mating part of the motor and extending only partly around said mating part with its lower end abutting the body of the motor.

In testimony whereof I affix my signature.

ARTHUR TOD PURSELL.